United States Patent Office 3,250,593
Patented May 10, 1966

3,250,593
METHOD OF PRODUCING CALCIUM CHLORIDE PELLETS
Le Roy A. Wilcox and Albert C. Speer, Ludington, Mich., assignors to The Dow Chemical Company, Midland, Mich., a corporation of Delaware
No Drawing. Filed Apr. 27, 1964, Ser. No. 362,955
2 Claims. (Cl. 23—90)

This invention relates to the production of calcium chloride pellets and more particularly concerns an improved method therefor.

U.S. Patent 2,646,343, issued July 21, 1953, discloses a method of producing substantially anhydrous calcium chloride pellets by spraying a hot liquid calcium chloride solution onto small solid semi-anhydrous particles of calcium chloride while subjecting said particles to a tumbling action in a drying gas, thereby to cause the liquid to contact the particles and dry thereon thus increasing their size to subsequently produce large anhydrous pellets. More specifically, the patented process comprises, maintaining at a temperature between 150° and 190° C. in a mixing zone a mass of semi-anhydrous calcium chloride particles, said particles being derived from later steps in the method, and spraying an aqueous solution of calcium chloride containing not less than about 50 percent of said calcium chloride, at a temperature within 25 centigrade degrees of its atmospheric boiling point, onto said mass of particles while subjecting them to a tumbling rolling motion in the presence of a drying gas having a temperature between 200° and 500° C. and being capable of abstracting moisture from said mass. The mass on which the solution is sprayed has an inventory weight between 0.07 and 0.4 of the weight of the daily input of the weight of the calcium chloride in the solution, the semi-anhydrous particulate material comprising said mass being introduced in the mixing zone at a rate between 8 and 30 times the weight of the calcium chloride in the solution. So-sprayed the mass is subjected, as aforesaid, to the drying action of a drying gas capable of abstracting moisture therefrom so as to produce a semi-anhydrous product containing from 3 to 13 percent of water, a portion thereof being further subjected to the action of a drying gas having a temperature of from 250° C. to 500° C. so as to render such portion anhydrous as final product. The portion so-dried further corresponds substantially to the calcium chloride content by weight of the incoming calcium chloride being sprayed into the mixer. The remainder of the semi-anhydrous product including dust and fines is returned to the mixer for use as the mass or base particles on which more calcium chloride liquor is sprayed and/or for dissolution (fines) into spraying liquor if necessary.

Though the above described patent method produces a substantially anhydrous calcium chloride final product having satisfactory quality, it possesses a number of disadvantages. One such disadvantage is that the method produces an excess of fines and dust, which ordinarily is dissolved, over that required as part of the particulated base on which the liquor is sprayed. In addition, an undesirably large ratio by weight of said fines and other sized particles as described above, of from 8 to 30 times that of the calcium chloride in the solution being sprayed thereon must be recycled back to the mixer. This not only causes unnecessary rehandling and reprocessing of a great deal of the material but also less corresponding production from said processing as compared to that obtainable if the production and recycle rate of said fines, with respect to the amount of final product produced, were not so great. Furthermore, to initially start the patented process for continuous operation, a large amount of particles is required for the particulated base as compared to the amount needed to start up the present improved process. Another problem in the patented process has been caking of the material in the dryer or mixer because the feed material has been too wet.

An object of the present invention, therefore, is to provide an improved method of producing anhydrous calcium chloride which avoids the disadvantages of the hereinbefore discussed patented process.

A further object of the invention is to provide a more economical method of producing substantially anhydrous calcium chloride pellets in greater quantity, employing a lower recycle ratio of the weight of the total chloride content in the solids to the weight of the total chloride content of the liquor applied thereon than that heretofore required.

A still further object is to provide an improved method of making essentially anhydrous calcium chloride pellets more efficiently, thus in greater quantity than was obtained heretofore, by spraying a hot liquid calcium chloride solution on a particulated calcium chloride base in a process wherein the quantity of excess fines and dust generated is less and wherein the necessary rate of recycle of said fines for use as a part of the particulated base from which to grow larger pellets, as described, is significantly reduced over that generated in the patented process.

Other objects and advantages will become apparent from the detailed description of the invention which follows hereinafter.

The above and other objects and advantages have been found obtainable by exposing the contents of the mixer, wherein preliminary drying is accomplished, to additional heat in the form of hot gases having temperatures above 500° C. and up to about 1760° C. By so-doing, the amount of recycled particles and fines necessary as the particulate base is unexpectedly reduced by increasing the heat input into the mixer as hot gases having temperatures between 500° C. and 1760° C., since these high gases, when combined with the lower temperature flue gases (200° to 500° C.) of the patented unimproved process, unexpectedly markedly decrease the recycle ratio from that heretofore required being 8 to 30, to a ratio of 2 to 8, by permitting more liquor to be applied to a lesser or substantially the same amount of base particles, fines and other sized particles. The excess of said particles and fines over that needed as the base, which out of economic desirability have heretofore normally been dissolved into liquor for application to said base, is also substantially reduced. This is entirely unexpected in that it would normally be predicted and anticipated that introduction of such high temperature gases would merely cause a marked increase in fines and dust, such as, for example, by flash drying of the calcium chloride liquor being sprayed into the mixer.

Accordingly, the process of the present invention, in constituting an improvement to the method disclosed in U.S. Patent 2,646,343, as described above, comprises in general supplying additional heat energy to the mixer as high temperature drying gases, having a temperature of from about 500° C. to about 1760° C., in an effective amount of B.t.u. content up to about 30 percent in excess of that employed in the complete drying operation in the patented process such that the recycle by the weight of total chloride in the particles to the weight of total chloride in the liquor is reduced to a ratio (recycle ratio) within the range of from about 2:1 to about 8:1, the additional heat content of said gases being diluted by the 200° C. to 500° C. flue gases and dissipated as aforesaid by the evaporation of water from the increased amount of liquor applied to the base, but without exceeding the melting point of the said base material. The actual amount of additional heat to be employed can be expressed, for example, as a percentage of the total amount of B.t.u.'s per day consumed in the unimproved patented process to produce the operating temperatures specified therein. The B.t.u.'s consumed in the patented process may, for example, be within the range of from about 3.8 to about 4.4 million (mm.) B.t.u.'s per ton of the final anhydrous product. It should be understood that notwithstanding the fact that additional heat energy may be added in accordance with the present invention to the heat employed in the patented process, when this additional heat is computed and applied over the increased tonnage produced in the present improved process, less B.t.u.'s per ton of product are required than in said patented process.

By increasing the heat input by the introduction of high temperature gases in the mixer in accordance with the present invention, thereby as aforesaid unexpectedly obtaining a reduced production rate of fines and dust, a reduced recycle ratio, and a greater production of the solid, substantially anhydrous, calcium chloride pelleted product results, thus providing a significantly more efficient, economical and improved process. In addition, a quality pellet is produced markedly improved over that heretofore obtained in that it is composed of less agglomerated fines.

One method of supplying the additional heat as gases exceeding 500° C. and up to about 1760° C. into the mixer is by employing an auxiliary burner disposed at one end of said mixer to produce a concurrent or countercurrent flow of additional hot combustion gases into the mixer. A concurrent flow is preferred, however. When employing such a burner it is imperative that said heat is introduced, diluted, and dissipated in such a manner that the particles in the mixer are neither melted, which would cause formation of particles having a hard glaze, nor ruptured, which would cause formation of less dense particles. Furthermore, the additional heat must be uniformly applied adjacent the surface of the particulated material where such internal application of the heat would not cause localized agglomeration. More specifically, the region in which the additional high temperature gases can be applied is preferably restricted to that region in which the hot calcium chloride liquor is sprayed on the pellets and cannot directly impinge against or be applied internal to the mass of said calcium chloride base particles. The increased material input of solution, and of particulated base through the process at the much lower solid-to-solution ratio, namely 2:1 to 8:1, than in the patented process, dissipates the additional heat to prevent the aforesaid glazing, rupture and melting of the calcium chloride particles.

The production capacity of solid anhydrous final product is normally increased by an additional amount, for example, within the range of from about 30 to about 90 percent, responsive to an additional increase in heat energy as aforesaid of up to about 30 percent.

The effective amount of additional heat energy employed in the improved process of the present invention within the limits hereinbefore stated is limited in a minimum amount primarily only by economic consideration in that in general a minimum effective amount of additional heat is used such as to preferably obtain a significant advantage and benefit in the unexpected effect derived in accordance with the present invention, said effect being substantially derived relative to the amount of said additional heat used.

In carrying out the improvement of the present invention with specific reference to the aforesaid patented process, hot semi-anhydrous recycled calcium chloride particles and lumps, both screened and unscreened, including dust as generated from various steps in the process, the screened particles other than lumps being of a size capable of passing a number 3 standard sieve, are introduced into one end of a slightly sloping rotary kiln type of preliminary dryer, referred to herein as a mixer, wherein they are rolled and tumbled, thereby to produce a mixing action. A solution after being concentrated in a prior step containing from about 35 to about 72 weight percent of calcium chloride, and preferably 50 to 67 percent, at a temperature preferably at least within 25 centigrade degrees of its atmospheric boiling point, is then sprayed on said hot particles as hot drying gases traverse the kiln-mixer in concurrent or countercurrent flow, preferably in concurrent flow with the material therein, to keep the particles hot. These hot drying gases comprise those as described and generated in the patented process and having a temperature of from 200° to 500° C., combined with the high temperature gases of the present invention having a temperature of from about 500° C. to about 1760° C. The combined hot drying gases so-derived are used both in the mixer and in the shelf dryer to maintain the process operating temperatures, as are set forth herein. These drying gases are mixed or diluted such that the temperature of the said gases in the mixer is as aforesaid at least about 200° C. but not in excess of a temperature such that the total heat content of the combined gases cannot be reduced by evaporation of water to below the melting point of the pellets lest they explode or rupture to a less dense and rougher particle. At these temperatures, then, though said particles are sprayed with calcium chloride solution, they do not remain noticeably wet inasmuch as only enough solution is applied so that it is absorbed by the particles and evaporated by the hot flue gases. The semi-anhydrous particles as they emerge from the mixer contain, for example, 12 percent or less of water. During the mixing operation, in addition to the liquor, the smaller particles disappear to become a part of dense pellets as the particles roll, tumble and grow while being sprayed with liquor in a heated condition. Air-borne dust also continually deposits on the growing particles. The temperature of the particles undergoing growth and preliminary drying in and emerging from the mixer ranges from about 150° to 210° C., although a preferable operating particle temperature is 170° to 190° C.

The calcium chloride pellets obtained from the mixing operation (preliminary drying), as by withdrawing them from the opposite end of the mixer, are then subjected to a first stage of drying, for example, in a shelf dryer such as the type as described in the hereinbefore mentioned U.S. patent wherein the particles are spread over a supporting surface and gently raked while being subjected to the drying action by a current of the hot combustion gases aforesaid originally generated or derived from other steps in the present process to dry said particles to a semi-anhydrous particulated solid containing from about 3 to about 11 percent water.

A portion or all of the semi-anhydrous particles so-dried are then passed through a set of screens wherein particles coarser than about 3 mesh and finer than about 20 mesh are removed leaving a sized semi-anhydrous product which is then subjected to a second stage of drying, as on shelves, with hot gases having a temperature of from about 250° to about 500° C., about 450° C. being preferred, to produce for subsequent storage or use a substantially anhydrous pellet product containing less than about 3 percent water and usually about 0.3 percent or less of water. The anhydrous pellets during this second stage of drying attain a temperature of from 180° to 340° C. The unscreened semi-anhydrous particles, and if desired lumps, are recycled to the mixer, the lumps being crushed, if desired, to a smaller size (less than 3 mesh) for use as the particulated base on which to spray more liquor, in a ratio of said chloride content of base-to-liquor of from about 2 to 1 to about 8 to 1. An inventory amount in the mixer is maintained, for example, between about 0.005 to about 0.4 of the calcium chloride in the calcium chloride solution. Any excess of fines and other size particles not needed for final product or for base may be dissolved into the liquor used for said spraying purposes.

During normal operation the amount of sized semi-anhydrous particles obtained from the first stage of shelf drying, which is forwarded for further drying to an anhydrous product, is such that its total chloride content plus that of the calculated dust loss corresponds to the total chloride content of the fresh calcium chloride solution (liquor) introduced into the mixer for use in the process. The portion of screened solid calcium chloride consists in part of lumps which may be recycled with or without pulverizing. The dust less than 60 mesh in size from the pulverizer and from the screens, including the recycled unscreened material, is returned to the rotary mixer and is about 5 to 30 percent of the weight of calcium chloride introduced into the process from the calcium chloride solution. A substantial portion of said dust generated in the process is taken up in the mixer and deposited on the rolling sprayed particles. The process of the present invention thus also makes possible the introduction and processing of more dilute calcium chloride spraying solution.

The final sized anhydrous product obtained comprises rounded, hard, free-flowing particles which resist abrasion and may be handled without excessive dust formation, having a bulk density of from about 55 to about 65 pounds per cubic foot, especially useful, for example, as a slowly dilquescent material to take up water.

The following examples are illustrative of the practice of the invention but it is understood that the invention is not limited thereto.

*Example 1*

A solution containing about 30 percent water, about 66 percent calcium chloride, about 2 percent potassium chloride, and about 1 percent sodium chloride, the balance consisting essentially of chlorides of other alkaline earth and alkali metals, was sprayed at a uniform rate of 412 tons per day (on a dry weight basis) into the input end of a 10 foot diameter mixer-kiln 69 feet long rotating at about 3.0 r.p.m. and equipped at said input end with a 4 inch auxiliary Maxon burner to generate hot drying gases and also with inlets to receive other hot newly generated and recycled flue gases for drying purposes. The Maxon burner had a burning capacity of about 2600 cubic foot of gas per hour, thus the ability to supply an excess of heat energy over the heat energy of the other generated and recycled drying flue gases of about 132,500 B.t.u.'s per ton of calcium chloride in the solution being sprayed into the mixer. The spray was applied over approximately a 20 ton inventory of calcium chloride particles being rotated within the mixer through a multi-orificed pipe extending about 20 feet into said input end. The particles in the aforementioned inventory were fed into the mixer to maintain said inventory at an overall rate of about 1700 tons per day or 1598 tons per day on a dry weight basis and comprised 3 to 20 mesh semi-anhydrous particles, fines, lumps, and dust particles of less than 60 mesh in size. The semi-anhydrous particles had an average water content of about 6 percent and a temperature of about 172° C.

The hot drying gases as derived in accordance with the present invention, including the flue gases of the unimproved process, were as aforesaid introduced at the input end of the mixer, thus their flow was directionally concurrent with the flow of particles. By introducing the solution and particles together with the drying gases in this manner a semi-anhydrous calcium chloride pellet intermediate product was produced and subsequently withdrawn from the mixer at a rate of about 2209 tons per day or about 2010 tons per day on a dry weight basis, said product containing about 9 percent water and having a temperature of about 160° C. The high temperature drying gases generated by the Maxon burner represented an additional input of heat energy over the lower temperature flue gases of 54.6 million B.t.u.'s per day, or about a 4 percent excess of heat energy based on the 1.365 billion B.t.u.'s per day total heat to the mixer and the dryer in the unimproved process. This represents about 132,500 B.t.u.'s additional heat per ton of final anhydrous product, or about 3.44 million B.t.u.'s of total heat used per ton of final product.

The pelleted calcium chloride withdrawn from the mixer was delivered to a shelf dryer at a rate of 2209 tons per day wherein the pellets, while being raked and screened, were further subjected to drying gases at a temperature of about 340° C. and sized into pellets between 3 and 20 mesh and those being both larger and smaller. A portion of the 3 to 20 mesh semi-anhydrous particles together with the smaller particles (dust) and oversized particles after being crushed were returned to the mixer at the aforementioned rate of about 1700 tons per day as the particulated base onto which more liquor could be sprayed. The balance of the 3 to 20 mesh particles, namely 438 tons per day, was further dried with hot gases to an anhydrous condition to provide 412 tons per day of final product. The amount of particles and dust was reduced such that none had to be dissolved into solution for disposal such as by spraying.

The recycle ratio employed in this example was 3.88 to 1 by weight, that is 3.88 parts by weight of the total chlorides in the solid particles used as a base to 1 part by weight of the total chlorides in the solution being sprayed on said base.

*Example 2*

Similarly as in Example 1, above, about 351 tons per day (on a dry weight basis) of the brine solution used therein was sprayed at a uniform rate into the mixer-kiln, the Maxon burner being adjusted to supply an excess of heat energy over the flue gases entering the mixer in an amount of about 155,500 B.t.u.'s per ton of calcium chloride in the solution being sprayed into said mixer. The solution was sprayed onto a constant inventory of about 12 tons of the same size and type of semi-anhydrous particles as used in Example 1, said particles being fed, however, into said mixer at an overall substantially uniform rate of about 1876 tons per day (1793 tons per day on a dry weight basis) in concurrent flow with said flue gases. These particles contained an average water content of about 4.4 percent and had a temperature of about 168° C. as they entered the mixer.

By introducing the particles and solution together in this manner in a ratio of about 5.11 to 1 by weight of the total chlorides in the solid particle to that of the chlorides in the solution, a semi-anhydrous calcium chloride intermediate pellet product was produced and subsequently withdrawn from the mixer at a rate of about 2330 tons per day containing about 8 percent water and having a temperature of about 154° C.

The hot drying gases generated by the Maxon burner represented a 5 percent additional input of heat over the 1.092 billion B.t.u.'s per day total heat in the flue gases being introduced into the mixer and shelf dryer of the unimproved process; thus constituting about 54.6 million B.t.u.'s per day additional heat. This also represents about 159,600 B.t.u.'s additional heat per ton of final anhydrous product, or about 3.35 million B.t.u.'s of total heat used per ton of said final product.

About 2330 tons per day of the semi-anhydrous particles emerging from the mixer were delivered to shelf dryers where they were subjected to drying gases of about 300° C., and a portion screened to separate the 3 to 20 mesh particles from those smaller and larger in size. As in Example 1 the amount of these particles returned to the mixer constituted about 1876 tons per day, while the balance of the particles, namely about 367 tons per day, were further dried with hot gases to an anhydrous condition to produce 342.2 tons per day as final product.

The excess particles and dust not returned to the mixer and not recovered as final product, in an amount between 2 to 3 percent of the 3 to 20 mesh calcium chloride particles, were dissolved into solution for spraying purposes.

*Comparative example*

In accordance with the patented process, a concentrated solution containing about 34.7 percent water and 65.3 percent chlorides of which 96.5 percent constituted calcium chloride, was sprayed in a mixer-kiln at a rate of about 20.75 tons of solution per day (13.55 tons on a dry weight basis) onto a 2 ton inventory of semi-anhydrous calcium chloride pellets therein. The pellets were being fed into the mixer at a rate of about 207.7 tons per day having an aqueous water content of about 4.4 percent and a temperature of about 170° C., while drying flue gases at a temperature of 300° C. were also being directed through the mixer during spraying. The input particles-to-solution represented a recycle ratio of about 14.66 to 1. An intermediate semi-anhydrous calcium chloride product was produced and withdrawn from said mixer at a rate of about 224.95 tons per day having a water content of 5.5 percent and a temperature of about 170° C., whereupon, it was returned to shelf dryers and subjected further to drying gases at about 250° C. while being raked to reduce the water content again to 4.4 percent. About 174.41 tons per day are then returned directly to the mixer without first screening together with 30.9 tons per day of particles derived from screening the balance of 45.32 tons per day of semi-anhydrous particles. The 14.42 tons per day remaining is then subjected to final drying with hot flue gases at 450° C. to produce 13.2 tons per day of anhydrous pellets of a size between 3 and 20 mesh.

From the foregoing examples illustrative of the present invention and the comparative example, it is readily apparent that employing excess heat energy over that used in the patented process significantly and unexpectedly substantially lowers the recycle ratio of from 8 to 30 times as heretofore required in the patented process to a ratio of from 2 to 8 to obtain the present improved process which is more efficient in that more production of final product is provided from a surprisingly small amount of additional heat energy provided in accordance with the present invention.

It is manifest that various modifications can be made in the process of the present invention without departing from the spirit or scope thereof and it is understood that we limit ourselves only as defined by the appended claims.

We claim:

1. In a method of producing a substantially anhydrous calcium chloride pelleted product from an aqueous solution containing not less than about 50 percent by weight calcium chloride wherein a mass of semi-anhydrous chloride particles in a weight ratio of particles-to-solution of from 8 to 30 times, based on the weight of total chloride solids in said particles to the total weight of chlorides in the solution, is maintained in a mixing zone at an elevated temperature and said solution, at a temperature within 25 centigrade degrees of its atmospheric boiling point, is sprayed onto said mass of semi-anhydrous particles while subjecting them to a tumbling rolling motion in the presence of drying flue gases capable of abstracting moisture therefrom to produce larger semi-anhydrous single and agglomerated particles, a portion of which are subsequently further dried with drying flue gases, after being screened, to a final anhydrous product, the remainder of said produced semi-anhydrous particles not so-dried further to the anhydrous state being recycled essentially for use as the mass of particles onto which more solution is sprayed; the improvement which comprises, introducing additional heat energy as hot gases having a temperature in excess of 500° C. and up to about 1760° C. into the mixing zone while spraying said aqueous calcium chloride solution therein, thereby lowering the recycle ratio of particles-to-solution to a ratio within the range of from about 2 to about 8, the maximum amount of said additional heat energy to be employed being an amount to provide said hot gases without exceeding the melting point of the semi-anhydrous chloride particles.

2. In a method of producing a substantially anhydrous calcium chloride pelleted product from an aqueous solution containing not less than about 50 percent by weight calcium chloride, wherein a mass of semi-anhydrous chloride particles in a weight ratio of particles-to-solution of from 8 to 30 times, is maintained in a mixing zone at an elevated temperature, said ratio being based on the weight of total chloride solids in said particles to the total weight of chlorides in the solution, and said solution, at a temperature within 25 centigrade degrees of its atmospheric boiling point, is sprayed onto said mass of semi-anhydrous particles while subjecting them to a tumbling rolling motion in the presence of drying flue gases capable of abstracting moisture therefrom to produce larger semi-anhydrous single and agglomerated particles, a portion of which are subsequently further dried with drying flue gases, after being screened, to a final anhydrous product, the remainder of said produced semi-anhydrous particles not so-dried further to the anhydrous state being recycled for use as the mass of particles onto which more solution is sprayed; the improvement comprising the steps of maintaining at a temperature between 150° and 210° C. in a mixing zone a mass of previously prepared semi-anhydrous particles of solid chlorides derived from later steps in the method; spraying the solution at a temperature within 25 centigrade degrees of its atmospheric boiling point onto the said mass of semi-anhydrous particles while subjecting them in said mixing zone to a tumbling rolling motion in the presence of drying gases having a temperature of from about 200° C. to about 1760° C. and being capable of abstracting moisture from the said mass so-sprayed, said mass having a weight between about 0.005 to 0.4 of the weight of daily input of the calcium chloride in the calcium chloride solution; introducing into the mixing zone semi-anhydrous calcium chloride particles derived from later steps in the method at a rate about 2 to 8 times by weight of the total weight of the chlorides in said solution; subjecting the resulting mixture at said temperature between 150° and 210° C. to the drying action of said drying gases capable of abstracting moisture therefrom so as to produce a semi-anhydrous product containing from 3 to 12 percent of water; separating from the semi-anhydrous product particles larger than about 3 mesh and those smaller than about 20 mesh; subjecting a portion of the resulting sized semi-anhydrous material to the drying action of a drying gas having a temperature of 250° to 500° C. so as to render the product anhydrous, the portion so-dried being substantially the amount of the calcium chloride content of the calcium chloride solution; and returning the remainder of the semi-anhydrous product including the separated coarse and fine particles to the mixing zone.

References Cited by the Examiner

UNITED STATES PATENTS

| | | | |
|---|---|---|---|
| 2,556,184 | 6/1951 | Hedley | 23—90 X |
| 2,646,343 | 7/1953 | Bennett et al. | 23—90 |
| 2,671,009 | 3/1954 | Comstock | 23—90 |
| 2,857,244 | 10/1958 | Graves | 23—90 |

OSCAR R. VERTIZ, *Primary Examiner.*

E. STEIN, *Assistant Examiner.*